Figure 1:
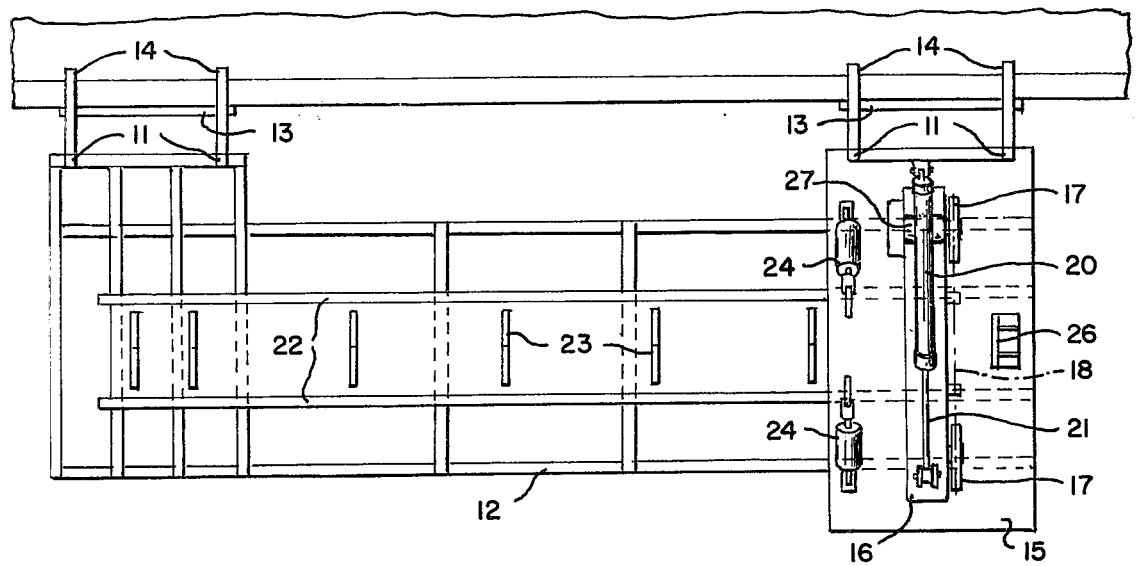

United States Patent [19]

Mary

[11] 4,434,092
[45] Feb. 28, 1984

[54] METHOD FOR PREPARING RADIOACTIVE CONTROL RODS FROM NUCLEAR REACTORS FOR STORAGE OR DISPOSAL

[76] Inventor: Paul Mary, P.O. Box 230, Niantic, Conn. 06357

[21] Appl. No.: 251,146

[22] Filed: Apr. 6, 1981

[51] Int. Cl.³ .............................................. G21F 9/34
[52] U.S. Cl. .................................. 252/626; 252/627
[58] Field of Search .................. 85/170, 171; 252/627, 252/626

[56] References Cited

U.S. PATENT DOCUMENTS

| | | | |
|---|---|---|---|
| 3,366,716 | 1/1968 | Cohen | 252/627 |
| 3,666,425 | 5/1972 | Wurm et al. | 252/627 |
| 3,672,247 | 6/1972 | Cherel . | |
| 3,855,684 | 12/1974 | Kendall . | |
| 4,000,391 | 12/1976 | Yeo . | |
| 4,080,858 | 3/1978 | Stolzer . | |

Primary Examiner—Brooks H. Hunt
Attorney, Agent, or Firm—Buell, Blenko, Ziesenheim & Beck

[57] ABSTRACT

Spent control rods from nuclear reactors are prepared for disposal by cutting off their handle ends and their velocity limiter ends by a cut off saw positioned in a pit underwater. The saw is driven by an air motor which is controlled outside the pit and has its exhaust carried up out of the water through a conduit. The control rods so truncated are packed into shielded casks for transport while the handle ends and velocity limiter ends are left in the pit or alternatively are loaded into separate shielded containers.

3 Claims, 5 Drawing Figures

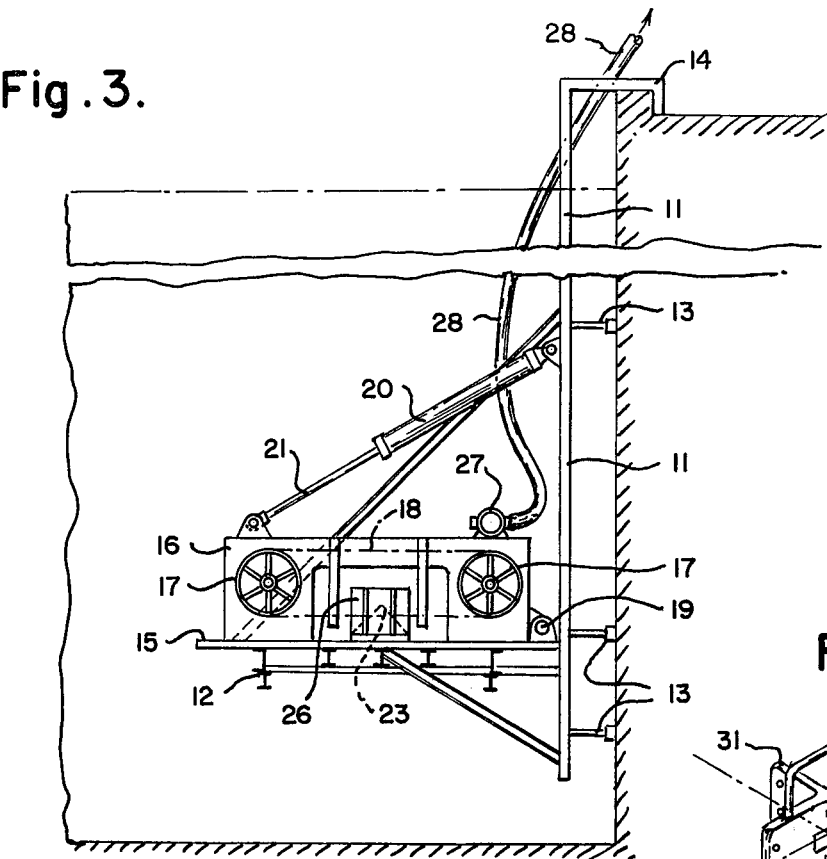
Fig. 3.
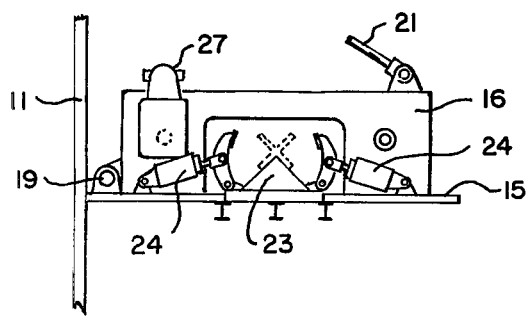
Fig. 4.
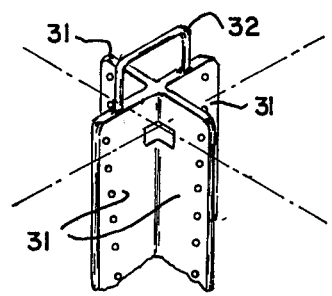
Fig. 5.
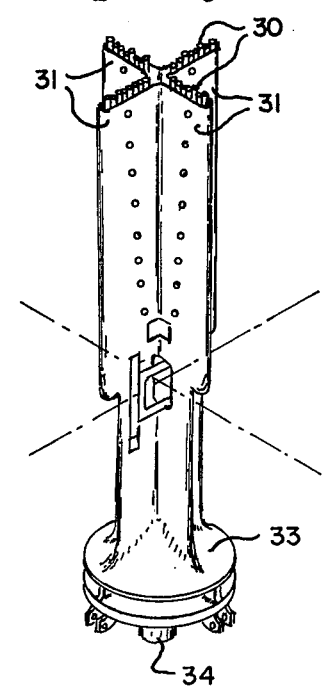

METHOD FOR PREPARING RADIOACTIVE CONTROL RODS FROM NUCLEAR REACTORS FOR STORAGE OR DISPOSAL

This invention is concerned with method and apparatus for preparing radioactive control rods from nuclear reactors for storage or disposal. It is more particularly concerned with such method and apparatus which cuts the rod into at least two discrete portions and deals with them separately.

Typical control rods as above mentioned comprise a neutron absorber material, such as boron, in powder form, packed into stainless steel tubes which in turn are enclosed in the blades of a sheath of cruciform shape. The sheath has a velocity limiter and coupling socket at its lower end and a handle at its upper end. The upper end of the sheath including the handle is usually a casting which is welded to the metal sheath at a level above the tops of the control rod tubes. In one form of control rod with which I am familiar the control rods are approximately 15 feet long, the top casting and handle portion is about 6½ inches high, the blade portion is about 12 feet long, the velocity limiter is circular in plan of a diameter somewhat in excess of the diagonal width of the sheath, and the coupling socket and velocity limiter are spaced below the blade portion about 2 feet or so.

From time to time it becomes necessary to remove from the reactor control rods that may have become corroded or otherwise damaged. Those rods, of course, are radioactive. The usual procedure is to remove the control rods to the fuel pool, which is a storage pit with perhaps 40 feet of water in it. It is also used to store discharged reactor fuel bundles. Each time the reactor is refueled some one hundred to two hundred more discharged bundles may be stored in the fuel pool. Occasionally it may be desirable to unload the whole reactor core into the fuel pool to have a dry reactor and connecting pipes, particularly if cracks have developed in the piping or fittings that require welding. Under the best conditions control rods have a service life of only about ten years. In the course of time, therefore, the fuel pool becomes crowded so that removal of the unusable control rods therefrom would be desirable. Heretofore no entirely satisfactory procedure for that operation has been developed. I am familiar with one attempt, which included shortening the rod by knocking off the velocity limiter below the blades and packing the rods so shortened into a lead cask of 3 inches wall thickness, but that cask loaded and drained of water showed 7,000 rem/hr radiation, whereas the radiation limit for shipping radioactive material is 200 rems/hr.

I have discovered that the great bulk of the radiation from radioactive control rods comes from the handle castings which, as I have mentioned, extend only a few inches above the blades. The handle casting radiation ranges from 18,000 to 200,000 rems/hr, whereas the radiation from the blades is only about 1,000 rems/hr. Even that reduced radiation is twice the lethal level, which is about 450 rems/hr.

The process of my invention, therefore, comprises cutting off the handle casting ends of the control rods while those rods are submerged in water in the fuel pool or a like pit, removing the blade portion from the cutting tool and loading it underwater into a steel liner which is placed in a radiation shielded container which can be removed from the fuel pool to a disposal site. The handle ends are left in the fuel pool. As they occupy only a fraction of the space of a control rod, handle ends in considerable quantity can be accumulated in the fuel pool without seriously diminishing its storage capacity for fuel elements. For the blade portion to fit into the shielded container, I find it necessary to cut off the velocity limiter end of the control rod below the blades and place those ends in a separate shielded container for shipment to a disposal or storage site. The control rods so curtailed pack snugly in casks.

Figure 2:
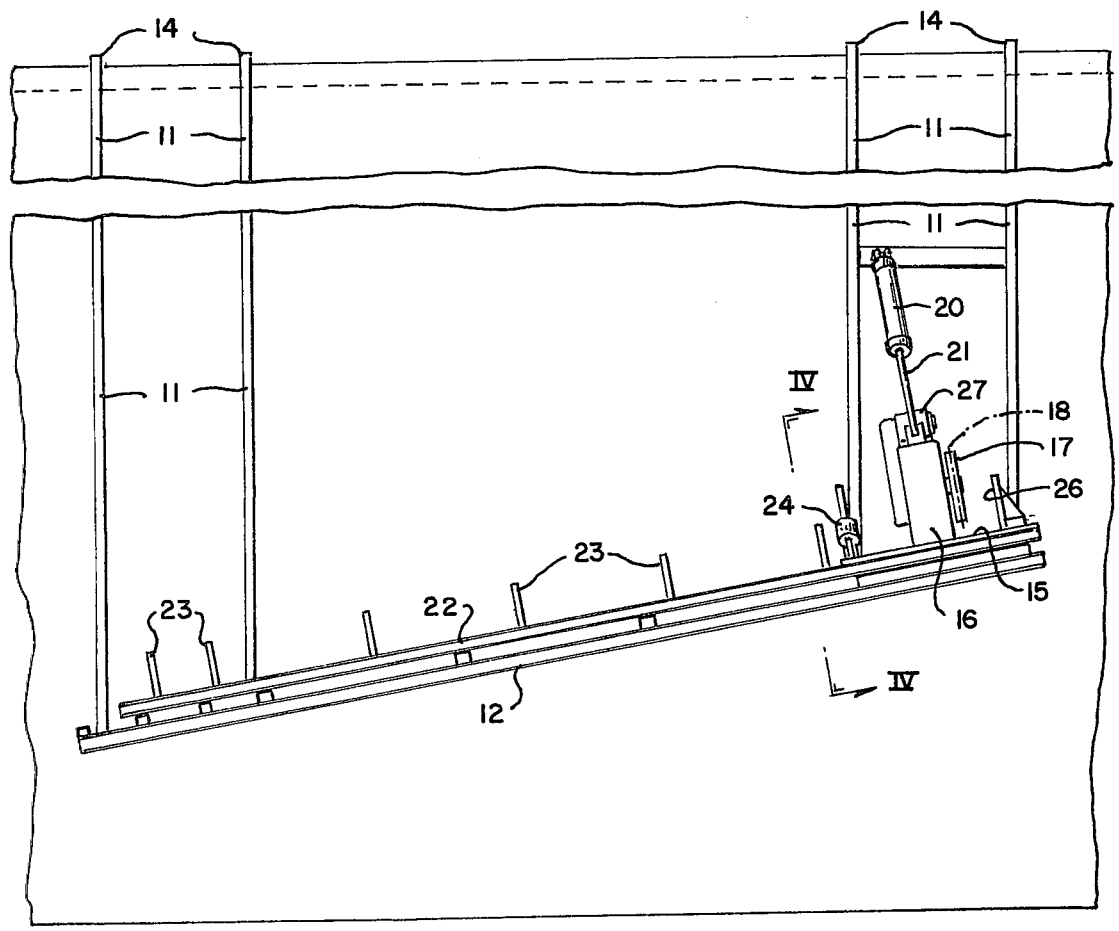

The apparatus of my invention comprises a cut-off saw operated by a high speed air motor and mounted on a frame which is lowered into the fuel pool along one wall. The frame also holds inverted V blocks on which the control rods are positioned with handle ends or alternately velocity limiter ends extending through the cutting plane of the saw. Air operated clamps hold the rod in position and an air cylinder causes the saw to move against the rod. The saw and clamps are controlled from outside the pool. An embodiment of the apparatus of my invention presently preferred by me is shown in the attached drawings in which:

FIG. 1 is a plan of the apparatus.
FIG. 2 is a side elevation of the apparatus of FIG. 1.
FIG. 3 is an end elevation of the apparatus of FIGS. 1 and 2.
FIG. 4 is a partial sectional view of the apparatus taken on the line IV—IV of FIG. 2.
FIG. 5 is an isometric of a form of control rod to which my apparatus is adapted.

My apparatus is supported underwater in a fuel pool or pit by a frame comprising a vertical portion 11 and a table 12 attached thereto near its bottom. Table 12 is not horizontal but slopes downwardly from its plate 15 end at a angle of about 10° to the horizontal. The purpose of this inclination will be explained hereinafter. Vertical portion 11 rests against a side wall of the fuel pool through projecting members 13 and is supported from the top by horizontal hook members 14 which hook over the curb surrounding the fuel pool. At one end of table 12 a plate 15 affixed thereto supports a cut-off saw 16, which may be a band saw as shown or other type of cut-off saw. Cut-off saw 16 is conventional and comprises a pair of upright mounted wheels 17 around which is trained an endless saw blade 18. Blade 18 is twisted in its bottom flight into a cutting plane which is normal both to the vertical portion 11 and the table 12 of the frame. Cut-off saw 16 is pivotally mounted on plate 15 at its end nearer vertical frame portion 11 on a pivot 19 which is parallel to vertical portion 11 and to table 12 of the frame. A double acting air cylinder 20 has an end pivotally connected to vertical portion 11 of the frame at a location above table 12 and a piston rod 21 extending from its other end and connected to the end of cut-off saw 16 opposite pivoted end 19.

Mounted on table 12 and extending away from plate 15 are parallel rails 22 to which are affixed upright inverted V blocks 23 spaced from each other along rails 22 so as to form supporting means for a control rod of the type shown in FIG. 5 to be described. V blocks 23 are parallel to each other and aligned along rail 22 parallel with the cutting stretch of saw blade 18. At the junction of rails 22 with plate 15 are positioned double acting air operated clamps 24, one on each rail. In line with V blocks 23 but on the other side of saw blade 18 is fixed an upstanding stop element 26.

Cut-off saw 16 is powered by a high speed air motor 27 which drives a wheel 17 of the saw through a geared speed reducer and double reduction chain drive. Air under pressure is supplied from a source not shown to double acting air cylinder 20, clamps 24 and high speed air motor 27 through conduits not shown. The oily air exhaust from high speed air motor 27, the air bled from double acting air cylinder 20 during saw feed and the air vented from double acting air operated clamps 24 when those clamps are opened is carried above the surface of the water in the pool through conduit 28. If the air is discharged underwater the bubbles arising through the pool make it difficult to view the operation of the apparatus.

A typical control rod shown in FIG. 5 comprises a number of neutron absorber tubes 30 encased in the four wings or blades 31 of a cruciform sheath. The bulk of the control rod comprises those blades, as has been mentioned. The upper end of the rod is provided with a handle 32 which may be a casting and is affixed to the ends of a pair of opposite blades 31. The blades 31 of the sheath continue below the lower ends of neutron absorber tubes 30 and merge into a velocity limited 33 circular in plan, the lower face of which carries a coupling socket 34.

As I have mentioned my process includes the steps of cutting off underwater at least the handle portion 32 of a control rod, and preferably the velocity limiter 33 as well. I cut off the handle portion 32 on the plane defined by the upper crossed chain lines of FIG. 5 above the upper ends of the neutron absorber tubes 30 and cut off the velocity limiter 33 on the plane defined by the lower crossed chain lines of that figure, below the ends of the neutron absorber tubes. At least the upper ends of those tubes 30 are plugged when they are filled with the powdered neutron absorber material. My table 12 is inclined as I have above described so that the tubes 30 cannot slide out of the sheath after the cutting operations are completed and interfere with loading of the blade portion into radiation shielded casks as described.

I accomplish this cutting by placing a control rod on V blocks 23 so that the V blocks fit between adjoining blades of the rod. Air is admitted to cylinder 20 so as to pivot cut-off saw 16 upwardly about its pivot 19 until the cutting stretch of the saw blade 18 clears the control rod. That rod is then moved longitudinally along the V blocks until its handle end 32 abuts stop element 26. This positioning is accomplished using the crane that is provided for placing reactor fuel bundles in the pool and removing them therefrom. Air operated clamps 24 are then closed against the blades of the control rod, locking it in place. Air motor 27 is started and air is exhausted from cylinder 20 so that cut-off saw 16 pivots downwardly and the cutting stretch of saw blade 18 makes contact with the control rod. The saw 16 is operated until the handle casting end is cut-off. When the velocity limiter end of the rod is to be cut-off the saw is raised, the clamps are released, the rod is lifted from the blocks and turned end-for-end, after which it is retained to the V blocks and the sequence of operations above set out is repeated.

In the foregoing specification I have described a presently preferred embodiment of my invention; however, it will be understood that the invention can be otherwise embodied within the scope of the following claims.

I claim:

1. The method of preparing radioactive control rods from nuclear reactors for disposal or storage off site comprising cutting off the handle ends of the rods from the blade portions while those rods are submerged in water in a pit, thereby separating the highly radioactive handle end portions of the rods from the less radioactive blade portions, so that the highly radioactive portions and the less radioactive portions may be disposed of separately.

2. The method of claim 1 including the step of also cutting off the less radioactive velocity limiter ends of the rods to that the remaining blade portions may be packed closely into radiation shielded casks.

3. The method of claim 1 or 2 in which the less radioactive portions are loaded into radiation shielded casks and the highly radioactive portions are submerged in water in a pit.

* * * * *

UNITED STATES PATENT AND TRADEMARK OFFICE
CERTIFICATE OF CORRECTION

PATENT NO. : 4,434,092

DATED : February 28, 1984

INVENTOR(S) : Paul Mary

It is certified that error appears in the above-identified patent and that said Letters Patent is hereby corrected as shown below:

Column 1, line 51, "7000" should be -- 7 --.

Column 1, line 53, "200" should be -- .2 --.

Column 4, line 16, "retained" should be -- returned --.

Claim 2, column 4, line 35, "to" should be -- so --.

Signed and Sealed this

Seventeenth Day of July 1984

[SEAL]

Attest:

GERALD J. MOSSINGHOFF

Attesting Officer   Commissioner of Patents and Trademarks